United States Patent [19]

Hermann et al.

[11] Patent Number: 4,701,376
[45] Date of Patent: Oct. 20, 1987

[54] PROFILED STRIP FOR SEALINGLY BORDERING WINDOW OR DOOR OPENINGS IN MOTOR VEHICLES AND BUILDINGS

[75] Inventors: Dietmar Hermann, Garbsen; Siegfried Walter, Hanover, both of Fed. Rep. of Germany

[73] Assignee: Continental Gummi-Werke Aktiengesellschaft, Hanover, Fed. Rep. of Germany

[21] Appl. No.: 829,523

[22] Filed: Feb. 13, 1986

[30] Foreign Application Priority Data

Feb. 14, 1985 [DE] Fed. Rep. of Germany ....... 3505016

[51] Int. Cl.$^4$ .......................... D02G 3/00; E06B 7/16; B32B 3/04; B32B 5/16
[52] U.S. Cl. ...................................... 428/358; 428/31; 428/122; 428/327; 428/331; 428/421; 428/422; 428/515; 49/490; 49/491
[58] Field of Search ............... 428/515, 421, 422, 122, 428/385, 31, 327, 331; 49/490, 491

[56] References Cited

U.S. PATENT DOCUMENTS

| | | | |
|---|---|---|---|
| 3,445,189 | 5/1969 | Maat et al. | 423/325 |
| 4,041,207 | 8/1977 | Takada et al. | 428/421 |
| 4,133,927 | 1/1979 | Tomoda et al. | 428/422 |
| 4,442,156 | 4/1984 | Yamaguchi | 428/143 |
| 4,643,923 | 2/1987 | Bernitz et al. | 428/122 X |

*Primary Examiner*—John E. Kittle
*Assistant Examiner*—Susan S. Rucker
*Attorney, Agent, or Firm*—Becker & Becker, Inc.

[57] ABSTRACT

A profiled rubber strip seal for bordering window and door openings. To simplify installation, or to promote relative movement between the strip and windowpanes, such seals are provided with overlay strips of friction-reducing material, especially synthetic materials that contain fluorine. To provide favorable conditions for satisfactory bonding between the overlay strips and the main strip, and also to make it possible to use difficult to handle materials, the elastomeric mixture of the main strip is altered by including therein silicic acid.

3 Claims, 1 Drawing Figure

U.S. Patent   Oct. 20, 1987   4,701,376
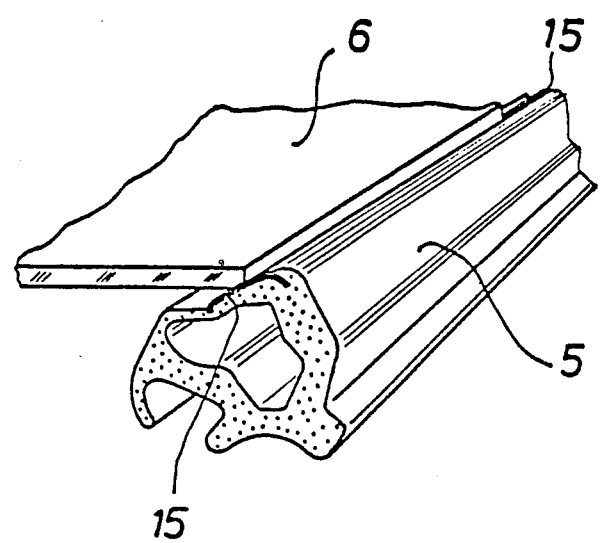

PROFILED STRIP FOR SEALINGLY BORDERING WINDOW OR DOOR OPENINGS IN MOTOR VEHICLES AND BUILDINGS

FIELD OF THE INVENTION

The present invention relates to a profiled strip for sealingly bonding window or door openings in motor vehicles and buildings. The strip includes a profiled main strip made of a first material, which is a mixture of a rubber-like elastomer, and at least one overlay strip that is made of a second, different material, and that is disposed on a portion of the outer surface of the main strip. Each overlay strip extends over the entire length of the main strip, and is bonded to the latter.

BACKGROUND OF THE INVENTION

Sliding windows and other windowpanes, door panels, etc. that can move encounter an undesired high resistance to sliding at the rubber profiled strip seals against which these panes rest due to the naturally present surface character of the seals. It has therefore long been the practice to provide the profiled strands, at least in those peripheral regions where friction is encountered, with a surface overlay that favors sliding. This overlay, in the form of a preformed thin strip, is joined with the profiled strip while the latter is still in an unvulcanized state. During the course of the subsequent vulcanization, the overlay is bonded to the profiled strip. It was hereby possible to intimately and permanently bond to the rubber of the profiled strip even those overlay strips of otherwise difficult to process fluorocarbons, such as the tetrafluoroethylene known under the trademark Teflon. However, under extreme conditions, especially when the profiled strips were sujected to very high or very low temperatures, such as in tropical and artic regions, separation of the overlay strip from the profiled main strip occasionally occurred.

Since these fluorine-containing synthetic materials have such good sliding characteristics, it is desirable to be able to retain such characteristics in the overlay strips. An object of the present invention is to improve the adhesion or bonding that can be achieved between the overlay strip and the profiled strip.

BRIEF DESCRIPTION OF THE DRAWING

This object, and other objects and advantages of the present invention, will appear more clearly from the following specification in conjunction with the accompanying schematic drawing, which is a perspective view of a portion of one exemplary embodiment of a two-material profiled strip seal, with a portion of a pane of a sliding window also being shown.

SUMMARY OF THE INVENTION

To realize the previously stated object, the present invention starts with profiled strips of the aforementioned general type, and improves the composition of the elastomeric mixture. It was surprisingly discovered that even greater bonding values, accompanied by greater insensitivity to extreme temperatures and other influences, were possible if the elastomeric mixture contained Silicic acid. It is recommended that the proportion of silicic acid not be less than 10% of the elastomeric portion of the mixture. Expediently, the proportion of silicic acid should be in a range of between 20 and 80% of the elastomeric portion.

DESCRIPTION OF PREFERRED EMBODIMENTS

Referring now to the drawing in detail, the profiled main strip 5 having the illustrated cross-sectional shape is advantageously produced from a weather-resistant rubber via extrusion. That outer peripheral portion of the main strip 5 that comes into sliding contact with the windowpane 6 is provided with an overlay strip 15 that is bonded to the main strip 5. The overlay strip 15 is preferably cut from a sheet of polytetrafluoroethylene, a thermoplastic synthetic material that contains flourine, etc. The overlay strip 15 forms on the main strip 5 a surface zone having an increased ability to slide, and consequently considerably reduces the resistance to movement of the pane 6.

The profiled main strip 5 itself is made, for example, of an ethylene-propylene terpolymer (EPDM) to which has been added silicic acid, which particularly promotes the bonding of the overlay strip 15. The silicic acid is preferably present in a range of between 20 and 80% by weight of the EPDM portion in the total mixture.

The present invention is, of course, in no way restricted to the specific disclosure of the specification and drawing, but also encompasses any modifications within the scope of the appended claims.

What we claim is:

1. A profiled strip for sealingly bordering window or door openings in motor vehicles and buildings while at the same time permitting relative sliding movement between the strip and a windowpane or door panel; said strip having improvement therewith to overcome binding problems between materials at least one of which has sliding movement as a characteristic wherein said improvement to overcome binding problems comprises:

a profiled main strip made of a first material, which is a mixture of a rubber-like elastomer, with said mixture also containing silicic acid as an admixture component to overcome binding problems; and at least one overlay strip that is made of a second, different material, and that is disposed on a portion of the outer periphery of said main strip; each of said overlay strips extends over the entire length of said main strip, and said at least one overlay strip is bonded to the latter more effectively due to said mixture also containing silicic acid as an admixture component to overcome binding problems;

said second material of each of said overlay strips being a synthetic material that contains fluorine;

the proportion of silicic acid in said elastomeric mixture of said first material of said main strip being at least 10% of the amount of elastomer.

2. A profiled sealing strip according to claim 2, in which said synthetic material is polytetrafluoroethylene.

3. A profiled sealing strip according to claim 2, in which the proportion of silicic acid is in a range of between 20 to 80% of the amount of elastomer.

* * * * *